United States Patent Office 3,486,686
Patented Dec. 30, 1969

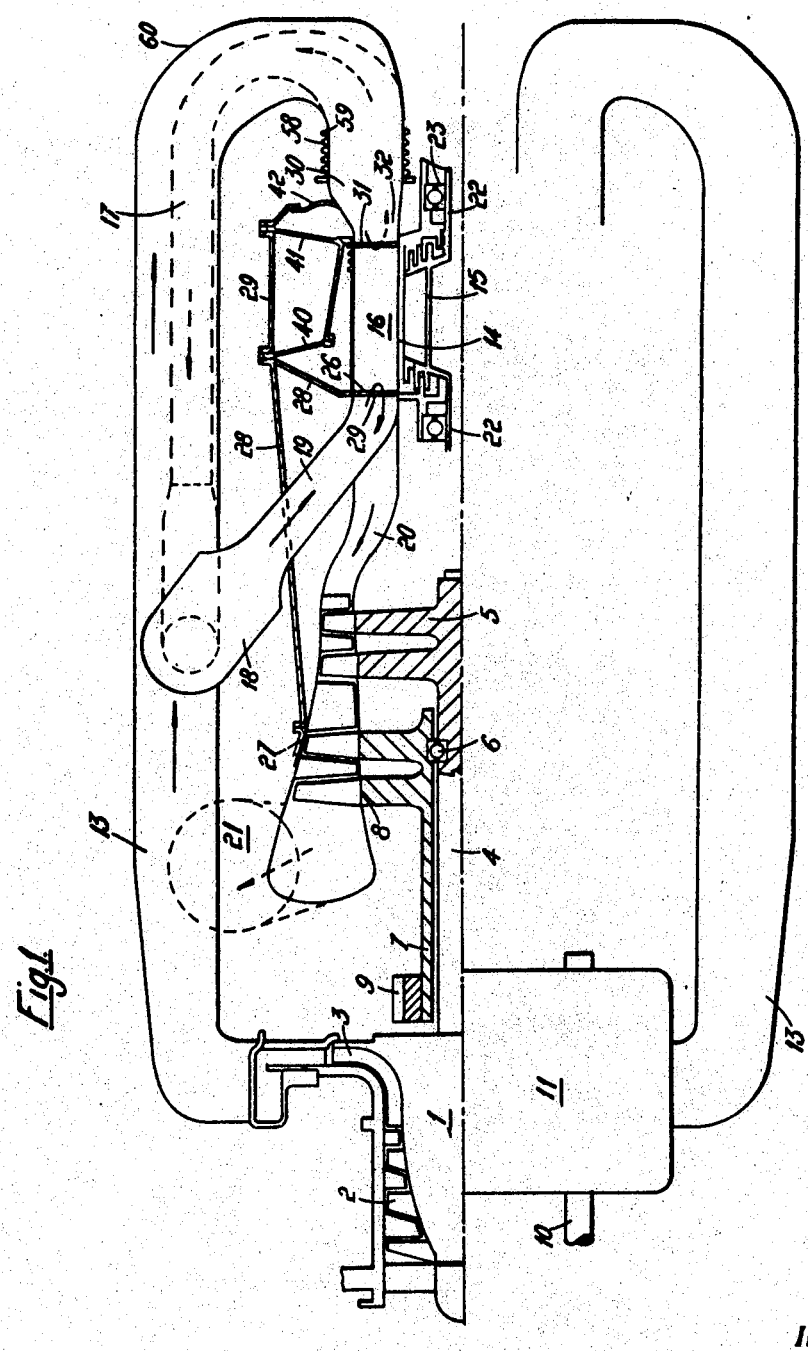

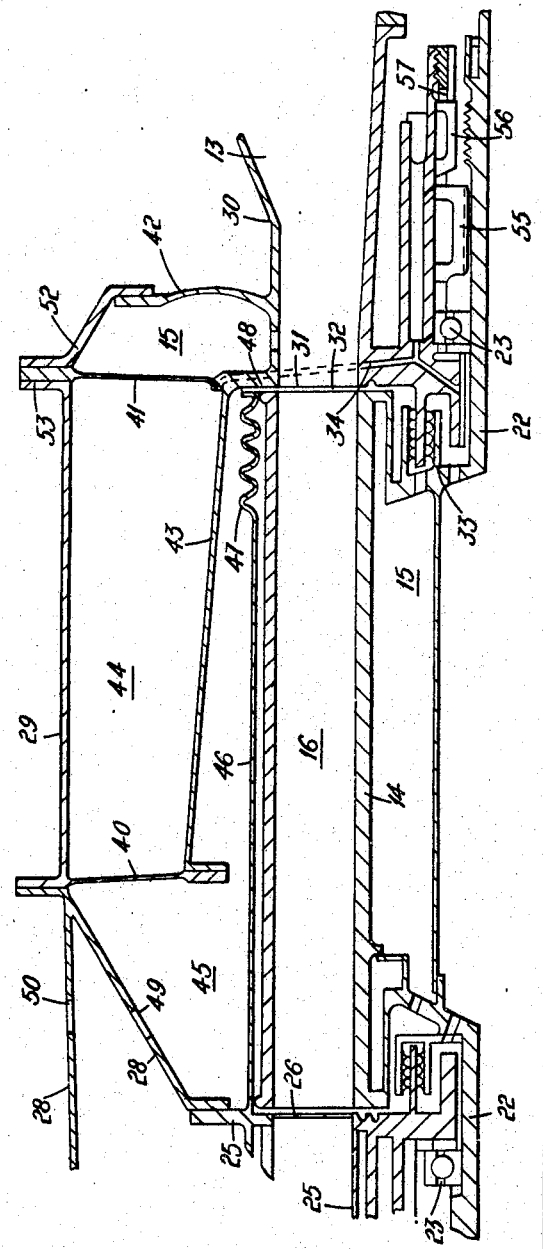

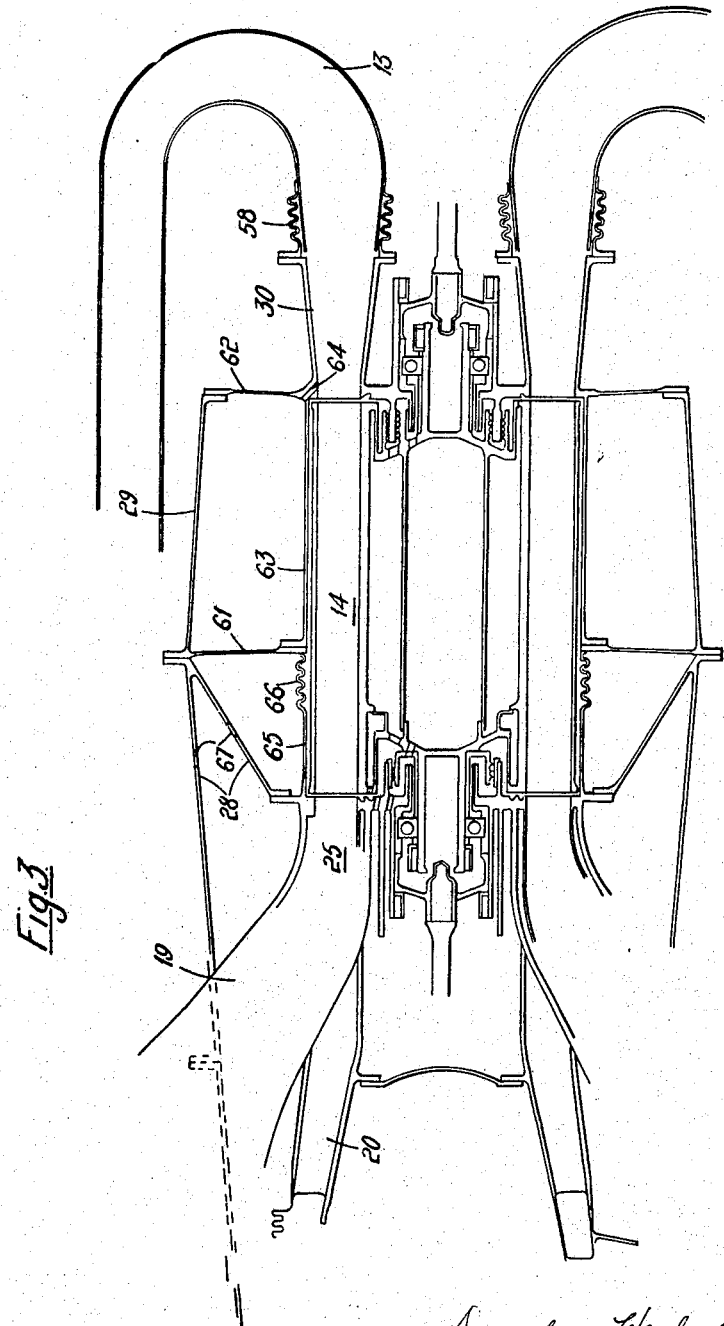

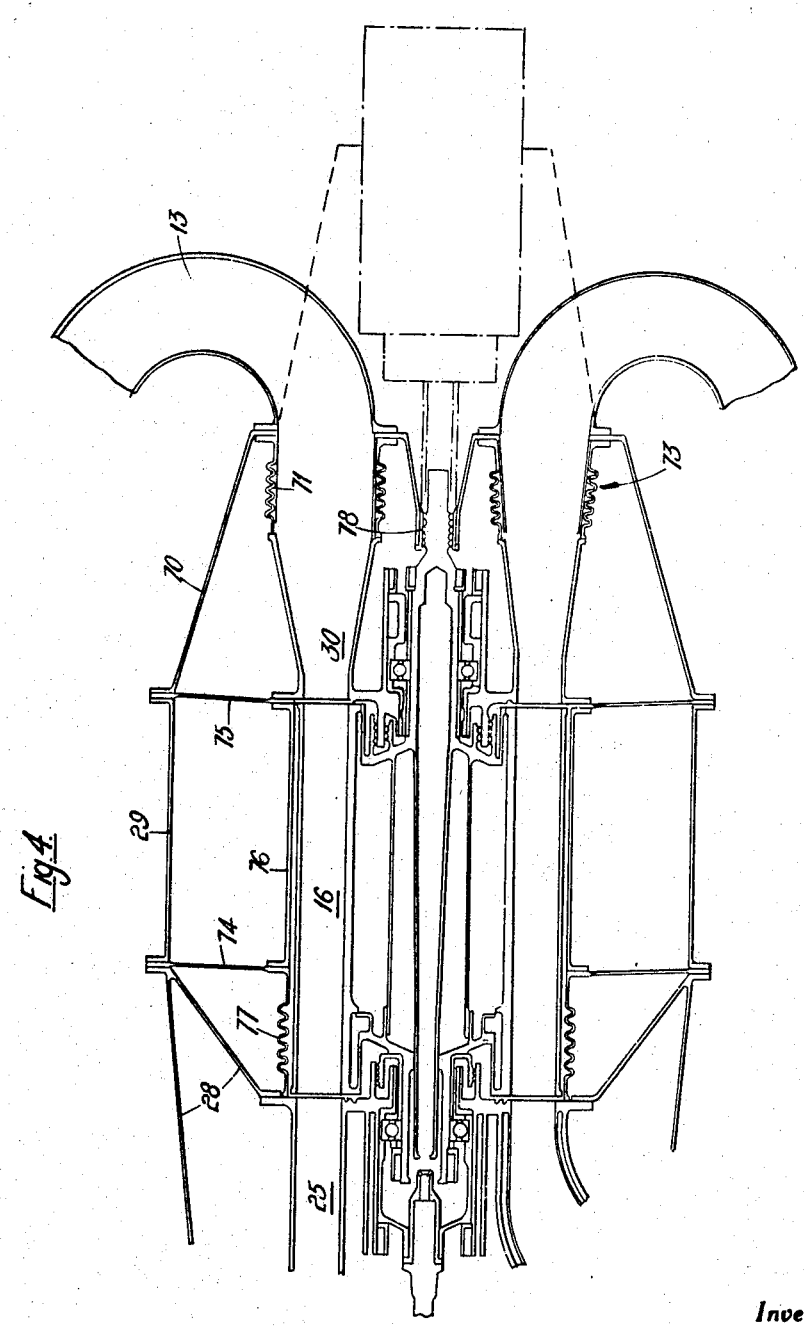

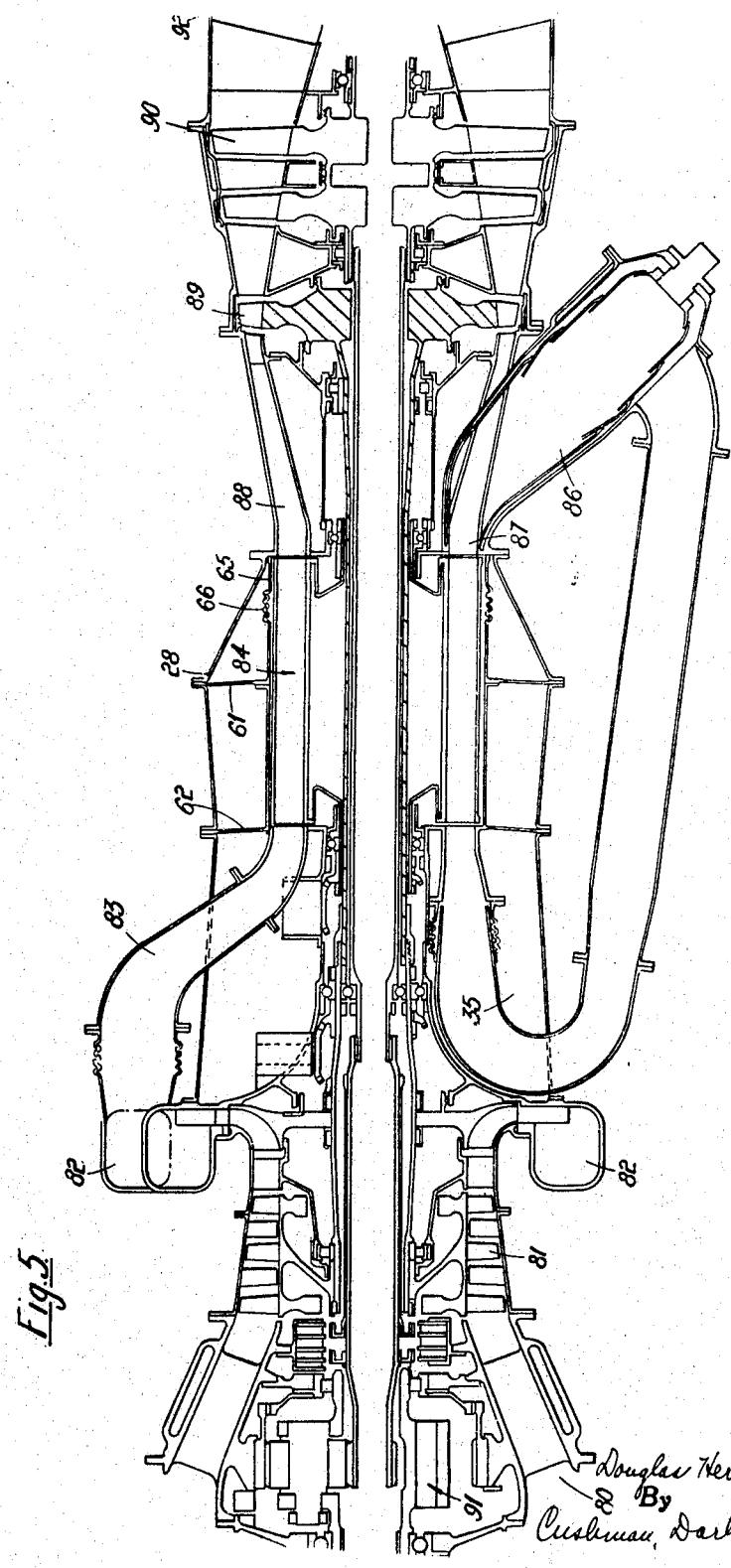

3,486,686
PRESSURE EXCHANGERS
Douglas H. Williamson, Derby, England, assignor to Rolls-Royce Limited, Derby, England, a British company
Filed Mar. 7, 1968, Ser. No. 711,274
Claims priority, application Great Britain, Mar. 30, 1967, 14,426/67
Int. Cl. F04b 37/02; F01d 25/24
U.S. Cl. 230—69    13 Claims

ABSTRACT OF THE DISCLOSURE

A pressure exchanger in which one of the end casings, which carry the rotor for rotation and are apertured to regulate flow of fluid into and out of the rotor, is mounted on a pair of diaphragms which allow axial movement of the casing, to accommodate thermal expansion of the rotor, but restrict radial movement.

---

This invention relates to pressure exchangers and relates particularly but not exclusively to pressure exchangers adapted for use in gas turbine engines.

A pressure exchanger is defined for the purposes of this specification as a machine in which compression and expansion processes occur simultaneously by means of pressure waves between two gas quantities in contact with one another. The processes take place in open-ended cells arranged for rotation relative to a plurality of ports through which the gas quantities at different pressures are ducted to and from the cells.

It is usual to mount the cells on the periphery of a rotor which rotates to bring the ends of the cells into succesive communication with ports disposed in end plates or casings by which and between which the rotor is mounted.

In applications of pressure exchangers to gas turbine engines and to other machines, for example rotary regenerative heat exchangers, in which the gases flowing into and out of the cells are at different temperatures in different parts of the rotor, it has been a problem to maintain the small end clearances between the ends of the rotors and the end plates or casing sufficiently small to prevent excess leakage of gases from the rotor due to differential thermal expansions of the rotor.

It is an object of the present invention to provide a pressure exchanger in which the clearances between the end of the rotor and the end plates or casings are maintained substantially constant.

According to the present invention there is provided a pressure exchanger comprising a rotor supported for rotation from a pair of end plates or casings, at least one of the end plates or casings being supported from fixed structure by a pair of diaphragms, said diaphragms, being sufficiently flexible and being so disposed as to allow controlled axial movement of the respective end plate while preventing any substantial radial displacement of the end plate.

In a preferred embodiment the ports in the end plates or casings communicate with ducts through which gases enter and leave the cells and the ducts communicating with the respective movable end plate or casing are adapted to accommodate said axial movement of the end plate or casing.

Preferably means are provided for reducing the loads on the bearings due to forces tending to separate the rotor and the end plates or casings. This way be achieved by arranging the diaphragms to form a closed chamber into which relatively high pressure air is fed, and by making the effective areas of the diaphragms on which the high pressure air acts unequal, a net force in the required direction to counteract the bearing loads may be produced.

In a preferred embodiment the pressure exchanger is used in a gas turbine engine, said gas turbine engine comprising compressor means, combustion equipment and turbine means, the pressure exchanger being adapted to compress the air leaving the compressor means before said air passes to the combustion equipment, and at the same time to expand the hot gases leaving the combustion equipment, before said gases pass to the turbine means.

In one preferred embodiment the pressure exchanger is a reverse flow pressure exchanger by which is meant that gases flowing into the cells at one end of the rotor have their direction of flow reversed and leave the cells at the same end of the rotor at which they entered the cells.

In such an embodiment, one of the end plates is disposed at that end of the pressure exchanger rotor which is adjacent the combustion equipment, hereinafter referred to as the hot end, and said end plate forms an integral part of a port casing in which are disposed ports which communicate with a plurality of ducts. Some of the ducts are adapted to convey hot gases from the combustion equipment into the cells of the pressure exchanger rotor and the remaining ducts are adapted to convey hot gases from said cells to the turbine means. The other one of the end plates is disposed at that end of the pressure exchanger rotor which is most remote from the combustion equipment, hereinafter referred to as the cold end, and said end plate forms an integral port of a port casing in which are disposed ports which communicate with a further plurality of ducts. Some of these ducts are adapted to convey compressed gases from the compressor means into the cells of the pressure exchanger and the remaining ducts are adapted to convey gases which have been further compressed by the pressure exchanger, from said cells to the combustion equipment.

Preferably it is the cold end casing which is supported by means of the diaphragms, and the air used to fill the chamber formed by the diaphragms is air tapped from one of the cold end ports or ducts conveying compressed air from the compressor means to the pressure exchanger rotor.

The rotor is preferably provided with hollow vanes at least at the hot end through which cooling fluid is passed.

The invention will now be more particularly described with reference to the accompanying drawings wherein:

FIGURE 1 is a sectional elevation of one half of a gas turbine engine embodying the pressure exchanger of the present invention.

FIGURE 2 is a detailed sectional elevation of the pressure exchanger of FIGURE 1.

FIGURE 3 is a view similar to FIGURE 2 but of a second embodiment of a pressure exchanger according to the invention.

FIGURE 4 is a view similar to FIGURES 2 and 3 but of a third embodiment of a pressure exchanger according to the invention, and FIGURE 5 is a sectional elevation of a gas turbine engine embodying the pressure exchanger of FIGURE 3.

Referring now to the drawings there is shown in FIGURE 1 a gas turbine engine having a compressor 1 which comprises three axial stages 2 and a centrifugal stage 3. The compressor 1 is driven via a shaft 4 by a two stage high pressure turbine 5. The shaft 4 is mounted for rotation in bearings 6 (only one of which is shown) and is disposed concentrically within a second shaft 7. The shaft 7 is mounted in bearings (not shown) and is driven by a two stage low pressure turbine 8, and drives a gear wheel 9 which transmits the drive from the shaft 7 to an output shaft 10 through a gear box 11.

Ducting 13 is provided for conveying air from the outlet of the centrifugal compressor stage 3 to a pressure exchanger 14 mounted at the rear end of the engine, i.e. at the opposite end to the compressor 1.

The pressure exchanger comprises a rotor 15 having a plurality of vanes 16 mounted on its periphery. The vanes 16 are circumferentially spaced apart forming therebetween a plurality of open-ended cells in which compression and expansion of air and combustion gases respectively takes place. Compressed air from the ducting 13 passes into the cells of the pressure exchanger and is further compressed therein, leaving the exchanger by way of ducting 17 (shown in broken lines), provided for conveying the air which is further compressed by the pressure exchanger to combustion equipment 18 in which the air is mixed with fuel from a supply means (not shown) and burned. The gases from the combustion chamber pass via ducting 19 to the opposite end of the pressure exchanger to that from which the compressed air left, where said gases are expanded in the cells thereby compressing the air delivered to said opposite end by way of the ducting 13 from the low pressure compressor. The expanded gases pass from the pressure exchanger to the high pressure turbine 5 via ducting 20 and then finally pass through the low pressure turbine 8 to atmosphere through an exhaust duct 21.

It is to be understood that all the ducts illustrated above the centre line of FIGURE 1 will be duplicated below the centre line and thus there are two combustion chambers 18, two exhaust ducts 21, two ducts 17, etc. In an alternative arrangement there may be an annular array of combustion chambers 18 and thus a plurality of each of the ducts 13, 17, 19 and 20.

The pressure exchanger is a reverse flow pressure exchanger by which is meant that the air or gases entering the cells at one end of the rotor of the pressure exchanger, have their direction of flow reversed and pass out of the cells at the same end of the rotor. This feature is not essential to the invention, however, as various alternative pressure exchanger cycles may be used where it is more convenient.

The pressure exchanger is mounted for rotation on stub shafts 22 by means of bearings 23. The pressure exchanger is driven by the gases passing into and out of the cells and this is arranged in this embodiment by allowing the gases entering the cells of the pressure exchanger to impinge on the vanes 16 at a suitable angle of incidence. However, in alternative embodiments the vanes of the rotor may be suitably curved or the pressure exchanger shaft 22 may be driven from the shaft 4 through suitable variable gearing, or may be driven by an independent device (such as an electric motor) via one of the stub shafts 22.

The ends of the ducts 19 and 20 adjacent the pressure exchanger come together to form a port casing 25 which has integral therewith an end plate 26. The end plate has formed therein four ports one port for each of the ducts 19 and 20. The ports communicate with the cells on the rotor whereby gases from the combustion chamber are fed into and out of the pressure exchanger. The casing 25, which will be referred to as the hot end casing, is connected to fixed structure 28 and thus does not move significantly in the axial direction with respect to the rotor 15 which is attached to the casing 25 by the bearing 23. There may, however, be a very slight relative movement between the end plate 26 of the casing 25 and the corresponding end face of the rotor 15 due to differential thermal expansion between the housing of the bearing 23 and the stub shaft 22. A small end clearance is therefore provided between the end of the rotor and the end plate 26 to allow for this and for any distortion of the end faces.

In a similar manner the ends of the ducts 13 and 17 adjacent the pressure exchanger form a port casing 30 which has an integral end plate 31 in which are formed four ports one port for each of the ducts 13 and 17.

A casing member 29 is rigidly attached to the casing member 28. The casing 30 is attached to a casing member 29 through three flexible annular diaphragms 40, 41 and 42, thereby allowing the casing 30 to move axially relative to the fixed casing 25. The diaphragms are sufficiently stiff in the radial sense, however, to prevent radial misalignment of the casing 30 with the casing 25 and rotor 15. A small end clearance 32 is provided between the end of the rotor and the end plate 31.

Referring now to FIGURE 2 in which the pressure exchanger and its mountings are shown in greater detail. Again only those parts of the engine above the centre line are shown since parts below the centre lines are identical.

The casing member 29, the annular diaphragms 40 and 41 form, together with a substantially conical member 43 extending from the cold end casing 30, a closed chamber 44 into which low pressure leakage air from the pressure exchanger rotor is fed.

A second closed chamber 45 is formed by the casing member 28, the diaphragm 40, the extension member 43 and a cylindrical sealing casing 46 which extends from the hot end casing 25. The sealing casing 46 carries an axially flexible seal 47 which abuts a flange 48 on the cold end casing 30 thereby preventing high pressure gases from entering the chamber 45. The chamber 45 is vented to atmosphere through bleed apertures 49 and 50 in the casing member 28, thus providing a pressure difference across the diaphragm 40 and conical member 43 acting towards the hot end casing 25.

A third closed chamber 51 is formed by the diaphragm 41 the cold end casing 30, the diaphragm 42 and a further casing member 52 which is attached to a flange 53 on the casing member 29. The chamber 51 is supplied with high pressure air directly from the duct 13 in the cold end casing 30, which air is at higher pressure than the leakage air supplied to the chamber 44 due to the pressure losses suffered by said leakage air in passing from the end clearance 32, through a seal 33 and to a duct 34 from which it passes into the chamber 44. Therefore, there is a pressure difference across diaphragm 41 which provides a pressure force on the cold end casing 30 towards the hot end casing 25, and a pressure difference across the diaphragm 42 which provides a pressure force on the cold end casing away from the hot end casing 25. The areas of the diaphragms 40, 41 and 42 and conical member 43 are chosen so that the net pressure force is in a direction which urges the cold end casing towards the hot end casing. By this means load on the bearings is reduced to a satisfactory value, and the bearing endfloat is fully taken up when the minimum end-clearance exists between the end faces of the rotor and the port casings. The diaphragms may be pre-loaded to provide a force urging the movable cold end casing towards the fixed hot end casing in order that during transient conditions (i.e. start-up) there is no reversal of load on the bearings.

In operation the rotor heats up due to the hot gases passing into and out of the cells. Since the hot end casing 25 is rigidly attached to fixed structure, and the rotor is supported from the casing 25 by the bearing 23 and there is little or no temperature difference between the hot casing 25 and the hot end of the rotor, there is substantially no relative movement between the casing 25 and the rotor 15 to change the end clearance 29. However, the thermal expansion of the rotor relative to the cold end casing 30 causes the rotor to grow and tend to close the clearance 32. With the arrangement of the present invention wherein the cold end casing is able to move axially, the movement of the cold end of the rotor 15 is reacted through the cold end bearing 23, and through locking members 55, 56 and 57 thereby transmitting the movement to the casing 30. The casing 30 thus moves with the cold end of the rotor 15 due to the flexibility of the diaphragms 40, 41 and 42 thereby maintaining the clearance 32 substantially constant.

The pressure loading of the diaphragms 40, 41 and 42 tends to reduce the load taken by the bearings 23 so that the bearing can be made smaller and more compact and this in turn helps to reduce the overall engine size; as explained above it also takes up all end-float on the bearings 23.

Due to the movement of the casing 30 a certain amount of flexibility has to be built into the ducts 13 and 17 and this is done by introducing bellows 58 and 59 into the ducts 13 and 17 respectively, (FIGURE 1). The bellows are introduced into the radially inner loops of each of the ducts 13 and 17 respectively (FIGURE 1). The bellows loads, produced on the ducts by gases being turned through 180° in the bends at 60, to be transmitted to fixed structure rather than to the cold end casing 30.

Again, as explained above, a similar bellows 47 is provided in the casing 46 to allow the movement of the casing 30.

By using diaphragms to allow the cold end casing 30 to move the sealing problems associated with sliding joints are overcome.

The main advantage of the present invention, however, arises in that the whole port casing 30 moves rather than just the end plate 31 and, therefore, it is not necessary to use a further sliding joint between the port casing and the end plate.

The flexible sealing member 47 is adapted to maintain sealing contact between itself and the flange 48 irrespective of movement of the cold end casing.

By arranging for only the cold end casing to move, only one set of seals and diaphragms is necessary to maintain the clearance 32 constant and the sizes of the diaphragms can be kept smaller because they are working at lower temperatures.

By arranging for the diaphragms to form pressure chambers the loads on the bearings due to the gas loads tending to separate the cold end casing from the hot end casing can be relieved and hence smaller bearings may be used, or alternatively the life of the bearing may be extended.

It will be appreciated that although three diaphragms have been described pressure balancing of the bearing loads can be effected using only two diaphragms forming one pressure chamber, as described below with reference to FIGURES 3 and 5, or even using only one diaphragm in conjunction with a flexible bellows as described below with reference to FIGURE 4.

In the embodiment described in FIGURE 3 the basic engine is very similar to that described in FIGURE 1 and is therefore not illustrated. Once again ducts 13 pass compressed air to the pressure exchanger 16, this air being further compressed in the pressure exchanger and exhausted through ducts (not shown) to a combustion chamber (not shown). From the combustion chamber the gases pass through ducts 19 into the pressure exchanger 16 and there they compress the incoming gases from the ducts 13 as described above. After the gases have performed this compression they exhaust from the pressure exchanger by way of the ducts 20.

The pressure exchanger rotor is itself identical to that shown in FIGURE 1 having the same bearing arrangement, and it will therefore not be described in detail. In the case of the present embodiment the mounting for the end casing which passes cold gases (the cold casing) is rather different. The portions 28 and 29 are similar in this embodiment to the previous embodiment but it will be noted that the member 42 is absent. In the present case the end casing 30 is mounted from the extension 29 on a pair of annular diaphragms 61 and 62, these diaphragms carrying, at their inner peripheries, an extension piece 63 from the casing 30 which extends round the outside of the pressure exchanger 14. The extension 63 together with the diaphragms 61 and 62 and the casing member 29 forms a sealed space to which a bleed of air is supplied through a bleed passage 64. The bleed passage 64 is illustrated as communicating with the cold end casing 30; it would of course be possible to arrange that this passage communicates with a required pressure level in another part of the engine.

To complete the encasement of the pressure exchanger 14 a further cylindrical casing member 65 is provided which extends from the hot end casing 25 and which carries at its extremity distant from this casing a bellows seal 66 which abuts against the inner periphery of the diaphragm 61. The space enclosed by this extension 65, the diaphragm 61 and the casing member 28 is vented by means of orifice 67 to ambient atmosphere.

In operation the air passing through the passage 64 is chosen to be at a predetermined pressure and hence the volume of air enclosed by the diaphragms 61 and 62 is at this predetermined pressure.

This pressure acting on the differential area between the diaphragms 61 and 62 is arranged to produce a resultant force pushing extension member 63 towards the hot end casing 25. As explained above this enables the end clearance of the pressure exchanger rotor to be maintained at a minimum amount and also enables end float in the pressure exchanger rotor bearings to be taken up enabling these to be run at their most efficient condition. The FIGURE 3 embodiment uses only two diaphragms which produce a single sealed chamber as compared with the rather more complicated arrangement of FIGURE 2.

It will of course be understood that some sealing arrangement is necessary to enable the cold end casing 30 some axial float and this is once again provided by bellows members 38.

In the embodiment of FIGURE 4 once again the pressure exchanger 14 is unchanged and once again the hot end casing 25, the casing pieces 28 and 29 are virtually identical with those described previously. In this embodiment, however, the cold end casing 30 is surrounded by a further casing member 70 which is attached to the casing member 29 at its extremity. The casing member 70 is substantially frusto-conical in form and encloses and is sealed to the bellows 71 and 73 which extend between the member 70 and the cold end casing 30. The inner periphery of the casing 70 is air sealed to the pressure exchanger rotor shaft by a casing extension member 72 and labyrinth air seal 78.

The arrangement of diaphragms which carries the cold end casing 30 is similar to that of FIGURE 3. Thus there are two diaphragms 74 and 75 connected at their outer peripheries to the casing members 29 and at their inner peripheries to a cold end casing extension 76. The inner periphery of the diaphragms 74 is again sealed to the hot end casing 25, in this case simply by way of a bellows seal 77.

The chamber formed by the casing member 28, the diaphragm 74 and the inner part 77 is vented to atmosphere, but the chamber formed by the casing 29, the diaphragms 74 and 75 and the inner member 76 is vented to atmosphere or alternatively to a low pressure zone (e.g. engine gear box or oil sump) of the engine. There is thus no pressure differential across the member 28, and either no pressure differential or only a small pressure differential across the diaphragm 74.

The space enclosed by the diaphragm 75, the casing 30 and the further casing members 70 and 72 is sealed, however, and is fed with a supply of air (not shown) at a predetermined suitable pressure. It will, therefore, be appreciated that the diaphragm 75 is subject to a pressure difference between ambient atmospheric pressure or some low pressure and the pressure in the latter space. Not only does this pressure act on the diaphragm 75 but by virtue of the complete enclosure of the right hand side of the chamber enclosing the cold end rotor bearing, this pressure acts over the entire area of the cold end casing.

The operation of this embodiment is that the pressure differential acting not only over the diaphragm 75 but also over the cold end bearing housing again produces a resultant force tending to push the casing 30 towards the casing 25. Once again this force enables the minimum end clearance to be achieved and takes up end float of the bearing. In this embodiment it will be noted that a large area of differential pressure exists from which the required forces can be derived. Therefore, it is not necessary to provide such a high pressure in the enclosed chamber and this means that the diaphragm 75 can be considerably thinner and/or have lower stresses than would otherwise be the case.

It will be noted that because the further casing member 70 is fixed to the casing member 29 and the duct 13 there may be a need to provide a bellows expansion section in the ducts 13. However, there is differential movement between the cold end casing 30 and the casing member 70 and the bellows seals 71 and 73 allow for this relative expansion.

It will be noted that FIGURES 3 and 4 illustrate a modification of the engine in FIGURE 1 using a different suspension for the casing 30 and the bellows 58 and 59. It will be appreciated that it would be possible to apply this construction to other engine designs, and FIGURE 5 indicates how the embodiment of FIGURE 3 could be applied to a different engine design.

FIGURE 5 shows in section a gas turbine engine which has an air inlet 80 and a compressor 81, comprising three axial stages and a centrifugal stage. The centrifugal stage feeds the air into a volute 82 from which the air can pass via a transition piece and further ducts 83 to pressure exchanger 84. From the pressure exchanger air which has entered from the ducts 83 and has been compressed is exhausted by ducts 85 to a combustion chamber 86. The outlet 87 from the combustion chamber feeds gases into the pressure exchanger 84 and in the pressure exchanger the exhaust gases compress the incoming gas from the compressor 81.

Gases exhausting from the pressure exchanger 84 pass out through ducts 88, a turbine 89 which is drivingly interconnected to the compressor 81 and through a second LP turbine 90 which is drivingly connected to an output gear box 91. From this output gear box the engine's main drive may be taken.

Exhaust gases from the turbine 90 pass out through an annulus 92 and thence are ducted to a jet pipe and final nozzle (not shown) to provide some residual thrust.

The suspension of the cold end casing joined to the ducts 83 and 85 will be seen to be similar to that shown in FIGURE 3 but in this case the diaphragms 61 and 62 have been reversed as has the casing member 28 and the extension and bellows 65 and 66. It will be appreciated that this is necessary because the hot and cold end casings have been reversed in this case, the hot casing being to the right while the cold casing is to the left in contradistinction to the embodiment of FIGURE 1 in which the cold casing was to the right and the hot casing was to the left.

In the above described embodiments it has always been arranged that the hot end casing is fixed while the cold end casing is allowed to move differentially. This is of course a more convenient arrangement since it is unnecessary to provide seals which have to operate at high temperatures if only the cold end casing moves. However, it should be understood that it is quite possible to arrange that the hot end moves in which case it would be necessary to reverse the embodiments described above.

I claim:
1. A pressure exchanger comprising fixed supporting structure, a rotor, a pair of end plates carrying bearing structure adapted to support said rotor for rotation, one of said end plates being disposed adajcent each of the axial ends of the rotor and being apertured to control admission and expulsion of working fluid from said rotor, at least two spaced apart flexible diphragms adapted to support one said end plate by extending from said fixed structure to said one end plate so as to allow controlled axial motion of said end plate while preventing any substantial radial movement of the end plate.

2. A pressure exchanger as claimed in claim 1 and in which there are a plurality of fluid flow ducts, a pair of casings each being integral with one said end plate, each said casing connecting said apertures to said ducts, said ducts being adapted to flex sufficiently to accommodate the axial motion of the casing.

3. A pressure exchanger as claimed in claim 2 comprising in addition fluid supply means connected to at least one of said diaphragms adapted to subject the diaphragm in operation to a differential pressure whereby to generate a net pressure force to urge the movable casing in an axial direction.

4. A pressure exchanger according to claim 3 and in which the pressure exchanger has one integral end plate and casing movable with respect to said fixed structure and one integral end plate and casing fixed with respect to said fixed structure, and in which the diaphragms support said movable integral end plate and casing and form two sides of a first closed chamber, opposite sides of at least one of the diaphragms being subjected in operation to fluid at different pressures, the effective areas of the diaphragm or diaphragms exposed to the fluids being such as to generate a net pressure force which urges the movable casing in a direction axial of the rotor.

5. A pressure exchanger as claimed in claim 4 and in which there are two said diaphragms forming one enclosed space and a further diaphragm forming with one of said two diaphragms a second enclosed space, means being provided to supply differing pressures of air to said first and second spaces.

6. A pressure exchanger as claimed in claim 3 and in which there is a substantially frusto-conical casing which forms with one of said diaphragms a second closed chamber, said frusto-conical casing surrounding the movable casing, the second closed chamber being provided, in operation, with pressurised air, said first chamber being subjected in operation to a lower pressure by venting to a suitable low-pressure area or to atmosphere.

7. A pressure exchanger as claimed in claim 5 and in which said second chamber extends over the entire end of the pressure exchanger rotor.

8. A pressure exchanger as claimed in claim 7 and in which said casing is rigidly attached to said fixed structure, the ducts from said end plates being flexibly connected to said casing.

9. A pressure exchanger as claimed in claim 1 and in which the pressure exchanger is a reverse flow pressure exchanger.

10. A pressure exchanger as claimed in claim 1 and in which said rotor comprises a plurality of vanes, each said vane comprising cooling passages therein.

11. A gas turbine engine comprising compressor means; combustion equipment and turbine means in flow series; and a pressure exchanger adapted and arranged to compress air leaving said compressor means before said air passes to said combustion equipment while simultaneously expanding hot gases leaving said combustion equipment before said air passes to said turbine means, said pressure exchanger comprising fixed supporting structure, a rotor, a pair of end plates carrying bearing structure adapted to support said rotor for rotation, one of said end plates being disposed adjacent each of the axial ends of the rotor and being apertured to control admission and expulsion of working fluid from said rotor, at least two spaced apart flexible diaphragms adapted to support one said end plate by extending from said fixed structure to said one end plate so as to allow controlled axial motion of said end plate while preventing any substantial radial movement of said end plate.

12. A gas turbine engine as claimed in claim 11 and in which air is bled from at least one compressor of said engine and applied to a face of said diaphragms to generate a net axial force on said movable casing.

13. A gas turbine engine as claimed in claim 11 and in which said movable casing is the casing which passes relatively cold gases.

References Cited

UNITED STATES PATENTS

| | | | |
|---|---|---|---|
| 2,779,530 | 1/1957 | Jendrassik | 230—69 |
| 3,169,749 | 2/1965 | Harris | 253—39 |
| 3,234,736 | 2/1966 | Spalding | 60—39.45 |

ROBERT M. WALKER, Primary Examiner